(12) United States Patent  
Quan et al.

(10) Patent No.: US 9,374,407 B2  
(45) Date of Patent: *Jun. 21, 2016

(54) MOBILE DEVICE APPLICATION STREAMING

(71) Applicant: NEXTBIT SYSTEMS INC., San Francisco, CA (US)

(72) Inventors: Justin Quan, San Francisco, CA (US); Michael A. Chan, San Francisco, CA (US)

(73) Assignee: Nextbit Systems, Inc., San Francisco, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/865,515

(22) Filed: Apr. 18, 2013

(65) Prior Publication Data

US 2014/0095667 A1 Apr. 3, 2014

Related U.S. Application Data

(60) Provisional application No. 61/708,794, filed on Oct. 2, 2012.

(51) Int. Cl.
*G06F 15/16* (2006.01)
*H04L 29/06* (2006.01)
(Continued)

(52) U.S. Cl.
CPC *H04L 65/60* (2013.01); *G06F 8/62* (2013.01); *G06F 8/63* (2013.01); *G06F 9/4406* (2013.01); *G06F 9/4416* (2013.01); *G06F 17/3007* (2013.01); *G06F 17/3015* (2013.01);

(Continued)

(58) Field of Classification Search
CPC ... H04L 67/42; H04L 67/10; H04L 29/06027; H04L 65/4084; H04L 67/06; H04L 67/34
See application file for complete search history.

(56) References Cited

U.S. PATENT DOCUMENTS 6,811,486 B1 11/2004 Luciano, Jr.
7,315,740 B2 1/2008 Maes
(Continued)

FOREIGN PATENT DOCUMENTS

EP 2680207 A1 1/2014

OTHER PUBLICATIONS

Non-Final Office Action mailed May 27, 2014, U.S. Appl. No. 14/158,733 by Quan, J., et al., filed Jan. 17, 2014.
(Continued)

*Primary Examiner* — Djenane Bayard
(74) *Attorney, Agent, or Firm* — Mattingly & Malur, PC (57) ABSTRACT

Technology for decomposing an application into fragments and streaming the application in fragments is disclosed herein. According to at least one embodiment, a computer-implemented method includes steps of determining multiple application fragments of a computer application, wherein each application fragment of the application fragments includes a code to present at least one interface of the computer application; storing the application fragments at a storage device; generating a resource dependency data structure, wherein for each specific application fragment of the application fragments, the resource dependency data structure includes identifications of resources that are needed for running the specific application fragment; and streaming, via a network component, at least one application fragment of the application fragments to a computing device.

20 Claims, 6 Drawing Sheets

(51) Int. Cl.
*G06F 17/30* (2006.01)
*H04L 29/08* (2006.01)
*H04L 12/26* (2006.01)
*H04L 9/08* (2006.01)
*H04L 9/32* (2006.01)
*G06F 9/44* (2006.01)
*G06F 9/445* (2006.01)
*H04W 8/24* (2009.01)

(52) U.S. Cl.
CPC .... *G06F17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01); *G06F 17/30286* (2013.01); *Y02B 60/188* (2013.01)

(56) References Cited

U.S. PATENT DOCUMENTS

| | | | |
|---|---|---|---|
| 7,326,117 B1 | 2/2008 | Best | |
| 7,490,045 B1 | 2/2009 | Flores et al. | |
| 7,774,457 B1 | 8/2010 | Talwar et al. | |
| 7,903,383 B2 | 3/2011 | Fukano et al. | |
| 8,005,956 B2 | 8/2011 | Williams et al. | |
| 8,234,348 B1 | 7/2012 | Tulchinsky et al. | |
| 8,290,920 B2 | 10/2012 | Mahajan et al. | |
| 8,315,977 B2 | 11/2012 | Anand et al. | |
| 8,423,511 B1 | 4/2013 | Bhatia | |
| 8,438,298 B2 | 5/2013 | Arai et al. | |
| 8,473,577 B2 | 6/2013 | Chan | |
| 8,475,275 B2 | 7/2013 | Weston et al. | |
| 8,478,816 B2 | 7/2013 | Parks et al. | |
| 8,494,576 B1 | 7/2013 | Bye et al. | |
| 8,495,129 B2 | 7/2013 | Wolman et al. | |
| 8,515,902 B2 | 8/2013 | Savage | |
| 8,539,567 B1 | 9/2013 | Logue et al. | |
| 8,577,292 B2 | 11/2013 | Huibers | |
| 8,589,140 B1* | 11/2013 | Poulin | 703/22 |
| 8,606,948 B2 | 12/2013 | Evans et al. | |
| 8,666,938 B1 | 3/2014 | Pancholy | |
| 8,747,232 B1 | 6/2014 | Quan et al. | |
| 8,764,555 B2 | 7/2014 | Quan et al. | |
| 8,775,449 B2 | 7/2014 | Quan et al. | |
| 8,812,601 B2 | 8/2014 | Hsieh et al. | |
| 8,840,461 B2 | 9/2014 | Quan et al. | |
| 8,868,859 B2 | 10/2014 | Schmidt et al. | |
| 2001/0039212 A1 | 11/2001 | Sawano et al. | |
| 2002/0161908 A1* | 10/2002 | Benitez et al. | 709/231 |
| 2003/0069037 A1 | 4/2003 | Kiyomoto et al. | |
| 2004/0018876 A1 | 1/2004 | Kubota et al. | |
| 2004/0203381 A1 | 10/2004 | Cahn et al. | |
| 2005/0147130 A1 | 7/2005 | Hurwitz et al. | |
| 2006/0030408 A1 | 2/2006 | Kiiskinen | |
| 2006/0073788 A1 | 4/2006 | Halkka et al. | |
| 2007/0130217 A1 | 6/2007 | Linyard et al. | |
| 2008/0055311 A1 | 3/2008 | Aleksic et al. | |
| 2008/0220878 A1 | 9/2008 | Michaelis | |
| 2009/0063690 A1 | 3/2009 | Verthein et al. | |
| 2009/0077263 A1 | 3/2009 | Koganti et al. | |
| 2009/0106110 A1 | 4/2009 | Stannard et al. | |
| 2009/0204966 A1 | 8/2009 | Johnson et al. | |
| 2009/0282125 A1 | 11/2009 | Jeide et al. | |
| 2010/0173712 A1 | 7/2010 | Buhr | |
| 2010/0235511 A1 | 9/2010 | Kai | |
| 2010/0257403 A1 | 10/2010 | Virk et al. | |
| 2010/0332401 A1 | 12/2010 | Prahlad et al. | |
| 2011/0076941 A1 | 3/2011 | Taveau et al. | |
| 2011/0078319 A1 | 3/2011 | Ishida | |
| 2011/0093567 A1 | 4/2011 | Jeon et al. | |
| 2011/0106755 A1 | 5/2011 | Hao et al. | |
| 2011/0126168 A1 | 5/2011 | Ilyayev | |
| 2011/0219105 A1 | 9/2011 | Kryze et al. | |
| 2011/0252071 A1 | 10/2011 | Cidon | |
| 2011/0275316 A1 | 11/2011 | Suumaki et al. | |
| 2011/0286026 A1 | 11/2011 | Matsuzawa | |
| 2011/0313922 A1 | 12/2011 | Ayed | |
| 2012/0017236 A1 | 1/2012 | Stafford et al. | |
| 2012/0023250 A1* | 1/2012 | Chen et al. | 709/231 |
| 2012/0028714 A1 | 2/2012 | Gagner et al. | |
| 2012/0036218 A1 | 2/2012 | Oh et al. | |
| 2012/0036239 A1 | 2/2012 | Donaghey et al. | |
| 2012/0079095 A1 | 3/2012 | Evans et al. | |
| 2012/0079126 A1 | 3/2012 | Evans et al. | |
| 2012/0084803 A1 | 4/2012 | Johansson et al. | |
| 2012/0110568 A1 | 5/2012 | Abel et al. | |
| 2012/0128172 A1 | 5/2012 | Alden | |
| 2012/0149309 A1 | 6/2012 | Hubner et al. | |
| 2012/0171951 A1 | 7/2012 | 't Hooft | |
| 2012/0203932 A1 | 8/2012 | da Costa et al. | |
| 2012/0210343 A1 | 8/2012 | McCoy et al. | |
| 2012/0303778 A1* | 11/2012 | Ahiska et al. | 709/223 |
| 2012/0311820 A1 | 12/2012 | Chang | |
| 2013/0007203 A1 | 1/2013 | Szu | |
| 2013/0008611 A1 | 1/2013 | Marcus et al. | |
| 2013/0044106 A1 | 2/2013 | Shuster et al. | |
| 2013/0045795 A1 | 2/2013 | Fiedler | |
| 2013/0086114 A1 | 4/2013 | Wilson et al. | |
| 2013/0117806 A1 | 5/2013 | Parthasarathy et al. | |
| 2013/0159890 A1 | 6/2013 | Rossi | |
| 2013/0219381 A1 | 8/2013 | Lovitt | |
| 2013/0223240 A1 | 8/2013 | Hayes et al. | |
| 2013/0225087 A1 | 8/2013 | Uhm | |
| 2013/0304898 A1 | 11/2013 | Aggarwal et al. | |
| 2014/0040239 A1 | 2/2014 | Hirsch | |
| 2014/0053054 A1 | 2/2014 | Shen et al. | |
| 2014/0101300 A1 | 4/2014 | Rosensweig et al. | |
| 2014/0170978 A1 | 6/2014 | Wolman et al. | |
| 2014/0215030 A1 | 7/2014 | Terwilliger et al. | |
| 2014/0379853 A1 | 12/2014 | Shelton | |

OTHER PUBLICATIONS

Non-Final Office Action mailed Jun. 9, 2014, for U.S. Appl. No. 14/167,939 by Quan, J., et al., filed Jan. 29, 2014.
Restriction Requirement mailed Jun. 12, 2014, for U.S. Appl. No. 14/251,463 by Quan, J., et al., filed Apr. 11, 2014.
Final Office Action mailed Jul. 24, 2014, U.S. Appl. No. 14/179,709 by Quan, J., et al., filed Feb. 13, 2014.
Final Office Action mailed Nov. 6, 2014, U.S. Appl. No. 14/158,682 by Quan, J., et al., filed Jan. 17, 2004.
International Search Report mailed Sep. 11, 2014, 7 pps., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.
Non Final Office Action mailed Nov. 3, 2014, for U.S. Appl. No. 13/772,163 by Quan, J., filed Feb. 20, 2013.
Non Final Office Action mailed Oct. 23, 2014, for U.S. Appl. No. 14/252,674 by Chan, M.A., et al., filed Apr. 14, 2014.
Non-Final Office Action mailed Aug. 26, 2014, for U.S. Appl. No. 14/267,823 by Chan, M.A., et al., filed May 1, 2014.
Notice of Allowance mailed Aug. 12, 2014, U.S. Appl. No. 14/179,709 by Quan, J., et al., filed Feb. 13, 2014.
Notice of Allowance mailed Sep. 3, 2014, U.S. Appl. No. 14/160,444 by Quan, J., et al., filed Jan. 21, 2014.
Restriction Requirement mailed Aug. 29, 2014, for U.S. Appl. No. 14/252,674 by Chan, M.A., et al., filed Apr. 14, 2014.
U.S. Appl. No. 14/479,087 by Chan, M.A et al., filed Sep. 5, 2014.
U.S. Appl. No. 14/479,140 by Chan, M.A et al., filed Sep. 5, 2014.
Co-Pending U.S. Appl. No. 13/772,163 by Quan, J., filed Feb. 20, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.

(56) References Cited

OTHER PUBLICATIONS

Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 14/158,733 by Quan, J., et al., filed Jan. 17, 2014.
Co-Pending U.S. Appl. No. 14/160,444 by Quan, J., et al., filed Jan. 21, 2014.
Co-Pending U.S. Appl. No. 14/167,939 by Quan, J., et al., filed Jan. 29, 2014.
Co-Pending U.S. Appl. No. 14/042,509 by Chan, M.A., et al., filed Sep. 30, 2013.
International Search Report and Written Opinion mailed Feb. 3, 2014, 7 pp., for International Application No. PCT/US13/62729 filed Sep. 30, 2013.
International Search Report and Written Opinion mailed Feb. 3, 2014, 9 pp., for International Application No. PCT/US13/62986 filed Oct. 2, 2013.
International Search Report and Written Opinion mailed Feb. 3, 2014, 7 pp., for International Application No. PCT/2013/62737 filed Sep. 30, 2013.
Co-Pending U.S. Appl. No. 14/179,709 by Quan, J., et al., filed Feb. 13, 2014.
Co-Pending U.S. Appl. No. 14/179,744 by Quan, J., et al., filed Feb. 13, 2014.
Non-Final Office Action mailed Mar. 7, 2014, Co-pending U.S. Appl. No. 14/158,715, by Quan et al., filed Jan. 17, 2014.
Non-Final Office Action mailed Mar. 10, 2014, Co-pending U.S. Appl. No. 14/173,680, by Quan et al., filed Feb. 5, 2014.
Co-Pending Design U.S. Appl. No. 29/486,424 by Chan, M.A., et al., filed Mar. 28, 2014.
Co-Pending U.S. Appl. No. 13/865,515 by Quan, J., et al., filed Apr. 18, 2013.
Co-Pending U.S. Appl. No. 14/042,398 by Chan, M.A., et al., filed Sep. 30, 2013.
Co-Pending U.S. Appl. No. 14/042,567 by Chan, M.A., et al., filed Sep. 30, 2013.
Co-Pending U.S. Appl. No. 14/221,174 by Chan, M.A., et al., filed Mar. 20, 2014.
Co-Pending U.S. Appl. No. 14/228,190 by Quan, J., et al., filed Mar. 27, 2014.
Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Co-Pending U.S. Appl. No. 14/267,823 by Chan, M.A., et al., filed May 1, 2014.
Non-Final Office Action mailed Apr. 2, 2014, U.S. Appl. No. 14/179,709 by Quan, J., et al., filed Feb. 13, 2014.
Non-Final Office Action mailed Apr. 3, 2014, U.S. Appl. No. 14/158,682 by Quan, J., et al., filed Jan. 17, 2004.
Notice of Allowance mailed Apr. 15, 2014, U.S. Co-pending U.S. Appl. No. 14/167,834, by Quan et al., filed Jan. 29, 2014.
Non-Final Office Action mailed May 8, 2014, U.S. Appl. No. 14/179,744 by Quan, J., et al., filed Feb. 13, 2014.
Non-Final Office Action mailed May 9, 2014, U.S. Appl. No. 14/160,444 by Quan, J., et al., filed Jan. 21, 2014.
Notice of Allowance mailed May 14, 2014, Co-pending U.S. Appl. No. 14/158,715, by Quan et al., filed Jan. 17, 2014.
Notice of Allowance mailed May 20, 2014, Co-pending U.S. Appl. No. 14/173,680, by Quan et al., filed Feb. 5, 2014.
McCormick, Z. and Schmidt, D. C., "Data Synchronization Patterns in Mobile Application Design," Vanderbilt University, pp. 1-14 (2012).
Notice of Allowance mailed Oct. 29, 2014, for U.S. Appl. No. 14/167,939 by Quan, J., et al., filed Jan. 29, 2014.
Notice of Allowance mailed Oct. 29, 2014, for U.S. Appl. No. 14/179,744 by Quan, J., et al., filed Feb. 13, 2014.
Notice of Allowance mailed Nov. 25, 2014, for U.S. Appl. No. 14/252,674 by Chan, M.A., et al., filed Apr. 14, 2014.
Non Final Office Action mailed Dec. 3, 2014, for U.S. Appl. No. 14/251,463 by Quan, J., et al., filed Apr. 11, 2014.
Notice of Allowance mailed Dec. 4, 2014, for U.S. Appl. No. 14/479,140 by Chan, M.A., et al., filed Sep. 5, 2014.
Notice of Allowance mailed Dec. 12, 2014, for U.S. Appl. No. 14/479,140 by Chan, M.A., et al., filed Sep. 5, 2014.
Notice of Allowance mailed Dec. 17, 2014, for U.S. Appl. No. 14/267,823 by Chan, M.A., et al., filed May 1, 2014.
Notice of Allowance mailed Dec. 19, 2014, for U.S. Appl. No. 14/479,140 by Chan, M.A., et al., filed Sep. 5, 2014.
Notice of Allowance mailed Dec. 22, 2014, for U.S. Appl. No. 14/179,744 by Quan, J., et al., filed Feb. 13, 2014.
Final Office Action mailed Dec. 23, 2014, for U.S. Appl. No. 14/158,733 by Quan, J., et al., filed Jan. 17, 2014.
Notice of Allowance mailed on Mar. 17, 2015, for U.S. Appl. No. 14/158,733, Quan, J., et al., filed Jan. 17, 2014.
Notice of Allowance mailed on Mar. 30, 2015, for U.S. Appl. No. 13/772,163, Quan, J., filed Feb. 20, 2013.
Notice of Allowance mailed on Mar. 30, 2015, for U.S. Appl. No. 14/267,823, Chan, M.A., et al., filed May 1, 2014.
Non-Final Office Action mailed Apr. 8, 2015, for U.S. Appl. No. 14/228,190, Quan, J., et al., filed Mar. 27, 2014.
Notice of Allowance mailed on Apr. 15, 2015, for U.S. Appl. No. 14/479,140, Chan, M.A., et al., filed Sep. 5, 2014.
Non-Final Office Action mailed May 15, 2015, for U.S. Appl. No. 14/042,398, of Chan, M.A., et al., filed Sep. 30, 2013.
Non-Final Office Action mailed Jun. 22, 2015, for U.S. Appl. No. 14/043,034, of Quan, J., et al., filed Oct. 1, 2013.
Non-Final Office Action mailed Jun. 22, 2015, for U.S. Appl. No. 14/158,682, of Quan, J., et al., filed Jan. 17, 2014.
Non-Final Office Action mailed Jul. 20, 2015, for U.S. Appl. No. 14/042,509, of Chan, M.A., et al., filed Sep. 30, 2013.
Notice of Allowance mailed Jul. 24, 2015, for U.S. Appl. No. 14/158,733, of Quan, J., et al., filed Jan. 17, 2014.
Non-Final Office Action mailed Aug. 21, 2015, for U.S. Appl. No. 14/042,567, of Chan, M.A., et al., filed Sep. 30, 2013.
Notice of Allowance mailed Sep. 2, 2015, for U.S. Appl. No. 14/042,398, of Chan, M.A., et al., filed Sep. 30, 2013.
Final Office Action mailed Sep. 9, 2015, for U.S. Appl. No. 14/251,463, of Quan, J., et al., filed Apr. 11, 2014.
Notice of Allowance mailed Oct. 2, 2015, for U.S. Appl. No. 14/228,190, of Quan, J., et al., filed Mar. 27, 2014.
U.S. Appl. No. 14/804,696, of Quan, J., et al., filed Jul. 21, 2015.
U.S. Appl. No. 14/835,981, of Chu, B., et al., filed Aug. 26, 2015.
U.S. Appl. No. 14/840,611, of Chan, M.A., et al., filed Aug. 31, 2015.
U.S. Appl. No. 14/840,636, of Chan, M.A., et al., filed Aug. 31, 2015.

* cited by examiner

MOBILE DEVICE APPLICATION STREAMING

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile device applications, and more particularly, to streaming of mobile applications designed to run on mobile devices.

BACKGROUND

In recent years, the use of wireless networks to distribute content within a service area thereof has become increasingly common. For example, a mobile device within range of a base station of a third generation (3G) or fourth generation (4G) cellular network is capable of "pulling content" from a remote server, for example, a content server, coupled to the base station. A mobile device can download a mobile application from an application distribution platform via a wireless network such as a WiFi or cellular network. Even with the increasing network speed of the modern WiFi and cellar networks, it can still take a significant time to download a large mobile application. A user of the mobile device has to wait for the download to be finished before the user can start installing and running the mobile application on the mobile device. Even for a user only wants to try a small percentage of the functionalities or stages of a mobile application, the user still need to download the whole application before the user can try any portion of the application.

Furthermore, a modern application can include a large amount multimedia content and can have a size of several gigabytes (GBs). A user of a mobile device may find that the mobile device does not have enough available storage space to accommodate the application. Therefore, the user may be forced to delete some of the existing applications or files stored on the mobile device, in order to run the application.

SUMMARY

Technology introduced here provides a mechanism to enable a user to run an application on a computing device before the whole application has been downloaded to the computing device. A processing server can decompose an application into a plurality of fragments. Each fragment of the application corresponds to one or more user interfaces, such as activities in an Android environment or views in an iOS environment. Resources are determined for each user interface. Resources, e.g. images, texts, videos, audios, 3D models, necessary for a specific user interface are included within a corresponding fragment. The dependency relationships between the fragments are also determined.

An application can be launched on a computing device by streaming one of more fragments of the application to the computing device. Fragments are streamed to and cached on the computing device based on the dependency of the fragments. For example, assuming fragments 5 and 6 can be only accessed via fragment 4, if the user is currently active on fragment 4, then fragments 5 and 6 may be prioritized for streaming to the computing device. A server can further determine the probability of each fragment being used based on other users' access patterns.

The application can be decomposed into fragments using a full server processing method. For example, a processing server can run an emulator to execute the application and determine the user interfaces and resources for each fragment of the application. The application can also be decomposed into fragments using a crowd sources device processing. Computing devices that have the full application stored locally can run the application and determine the user interfaces and resources for each fragment of the application. Then the fragmenting information can be updated to a server so that the server can decompose the application on the server accordingly.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
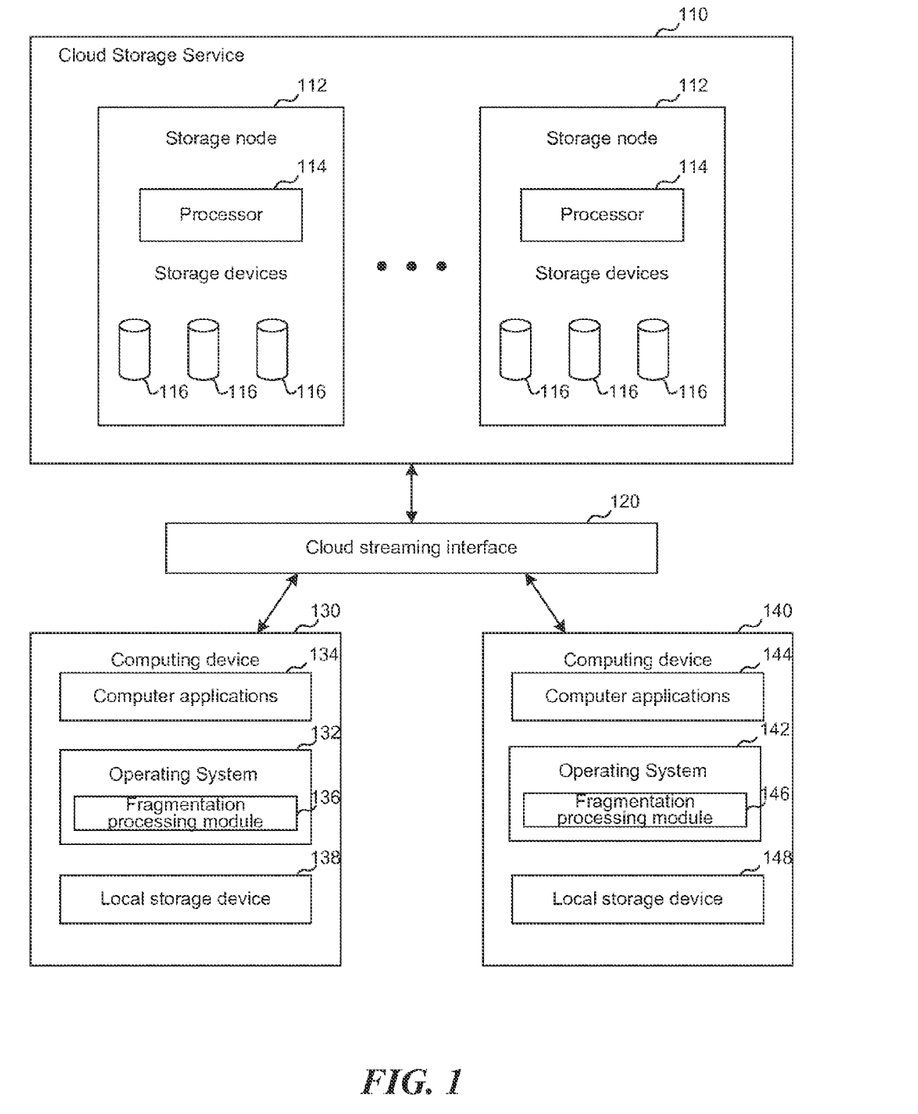
FIG. 1 illustrates an example system for streaming applications to computing devices.

FIG. 1 illustrates an example system for streaming applications computing devices. The system includes a cloud storage service 110 configured to store applications and determine fragmentation of the applications. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud streaming interface 120 can also be included to stream fragments of applications from the cloud storage service to the computing device. The cloud streaming interface 120 can include network communication hardware and network connection logic to receive the information from computing devices. The network can be a local area network (LAN), wide area network (WAN) or the Internet. The cloud streaming interface 120 may include a queuing mechanism to organize fragments to be streamed to the computing devices. The cloud streaming interface 120 can communicate with the cloud storage service 110 to send requests to the cloud storage service 110 for requesting fragments of the applications.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can backup application states of the computer applications 134 to the cloud storage service 110. The computing device 130 includes at least one local storage device 138 to store the computer applications, application fragments, and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a fragmentation processing module 136 to process the application fragments streamed from the cloud storage server 110. Similarly, another computing device 140 can also retrieve application fragments from the cloud storage service 110.

Figure 2:
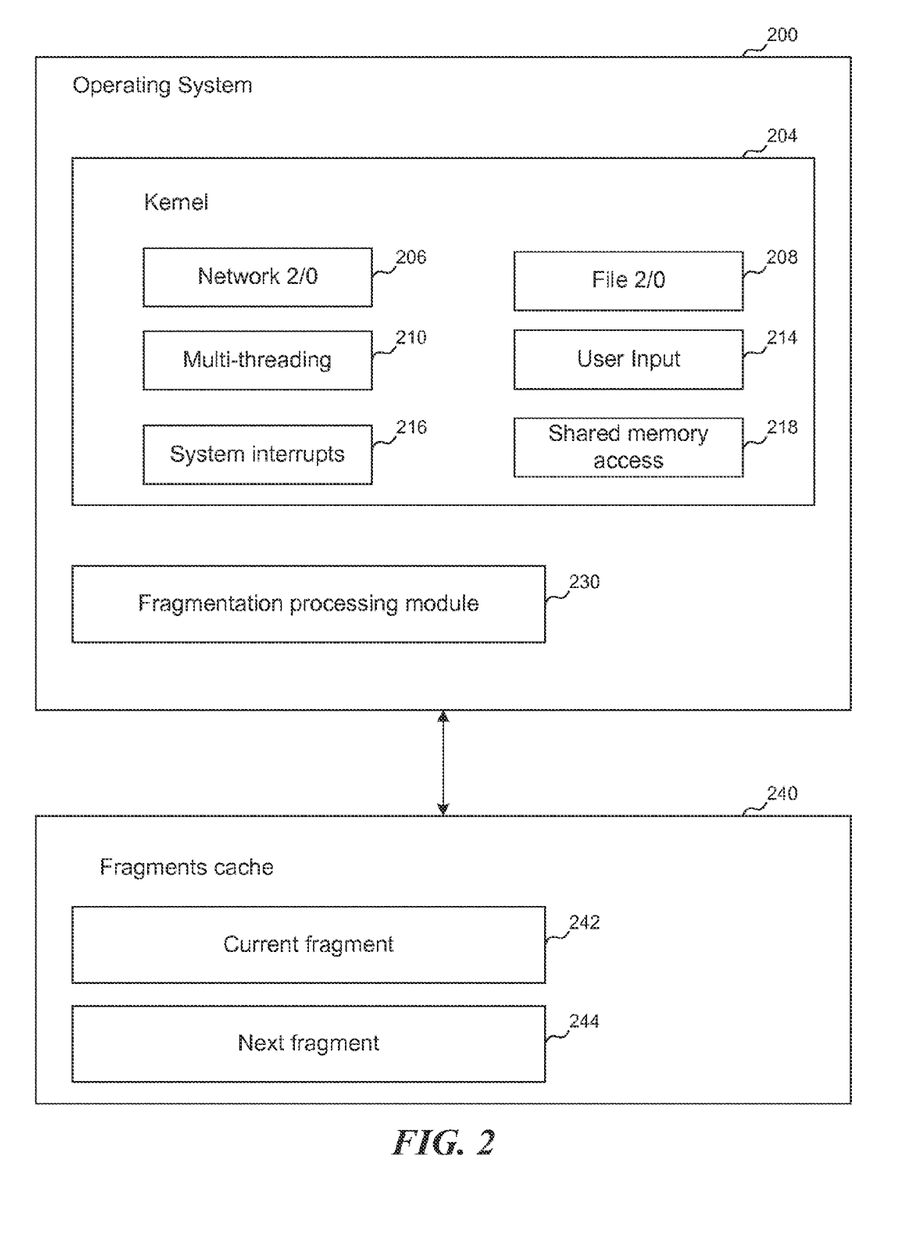
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A fragmentation processing module 230 runs on top of the kernel 204. The fragmentation processing module 230 processes the application fragments retrieved from the cloud storage service and runs the application as that the entire application has been stored in the computing device. In the example of FIG. 2, a fragments cache 240 includes a current fragment 242 that currently run on top of the operating system 300. The fragments cache 240 can further include a next fragment 244 that is ready to start seamlessly after the current fragment 242.

Figure 3:
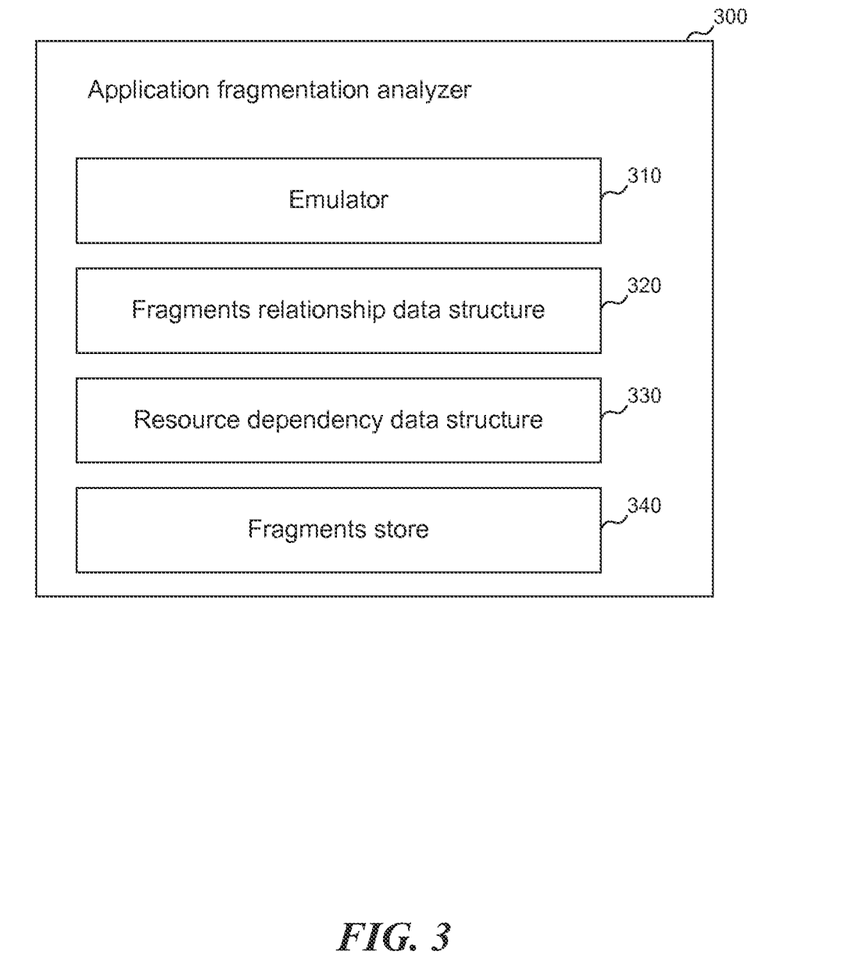
FIG. 3 illustrates an example of an application fragmentation analyzer.

FIG. 3 illustrates an example of an application fragmentation analyzer. The application fragmentation analyzer can be used by a storage server or a cloud storage service, such as the cloud storage service 110 as illustrated in FIG. 1. For example, the application fragmentation analyzer can run on the cloud storage service 110 to decompose an application into fragments. As illustrated in FIG. 3, the application fragmentation analyzer 300 includes an emulator 310 to execute the application determine the user interfaces and resources for each fragment of the application. The emulator 310 simulates an environment as a computing device on which the application runs.

By running the application on the emulator 310, the application fragmentation analyzer 300 can determine a plurality of fragments of the application. Each fragment corresponds to one or more user interfaces of the application. For example, for an Android application, a user interface can include an activity of the Android application. For an iOS application, a user interface can include a view of the iOS application. For a HTML5 application, a user interface can include a page of the HTML5 application.

Once the fragments are determined, the application fragmentation analyzer 300 further generates a fragments relationship data structure 320. The fragments relationship data structure 320 includes the information whether a fragment can lead ("link") to another fragment during the operation of the application. For example, assuming fragments 5 and 6 can be accessed via fragment 4, the fragments relationship data structure 320 can includes information that fragment 4 can lead to fragments 5 and 6.

The application fragmentation analyzer 300 can further generate a resource dependency data structure 330. The resource dependency data structure 330 includes information regarding the resources needed for running each fragment of the application. The resources can include images, icons, texts, audios, videos, 3D models, or other data included in the application. For instance, if a fragment 3 of the application needs to display an image A and play an audio clip B during the operation of the fragment 3 of the application, the resource dependency data structure 330 includes information that fragment 3 needs the image A and audio clip B.

Based on the information in the fragments relationship data structure 320 and the resource dependency data structure 330, the application fragmentation analyzer 300 can generate the fragments of the application in a fragments store 340. The fragments store 340 includes all the fragments of the application. In one embodiment, each specific fragment can include the resources that the specific fragment needs. In another embodiment, a fragment does not include all resources that the fragment needs. When the fragment is transmitted to a computing device, the corresponding resources are transmitted along with the fragment according to the resource dependency data structure 330.

The application fragmentation analyzer 300 decomposes an application into fragments. A computing device can download enough fragments to run the application at the current status, instead of downloading the entire application. The computer device can further download and cache the fragments that would possibly follows the fragment currently running.

The application fragmentation analyzer 300 automatically determines the fragments of the application, without human intervention. The developer of the application does not need to do any extra work for decomposing the application into fragments. The application fragmentation analyzer 300 automatically determines the fragments based on the flow of the application and the resources dependency information.

In some other embodiments, the application fragmentation analyzer can be used by as a crowd sources device processing. Computing devices that have the full application or a portion of the application stored locally can use the application fragmentation analyzer to determine the user interfaces and resources for each fragment of the application. Then the fragmenting information can be updated to a server so that the server can decompose the application on the server accordingly and streams the fragments to the next requesting computing device. The computing device does not need to determine all fragments of the application. A first computing device can just determine a portion of the application that it has run locally into fragments. This fragmenting information is collected to the server. A second computing device can stream the fragments and may possibly run an even larger portion of the application. The second computing device can generate additional fragments that the first computing device does not generate. Collectively, computing devices can generate the fragments of the application so that the server just needs to use the fragmenting information to stream the fragments to a device that requests the application in the future.

In one embodiment, the fragments of the application can be in native code format for the operating system of the computing device. In another embodiment, the fragments can be in an interpretative or markup language such as HTML5 (HyperText Markup Language 5).

In one embodiment, the operating system of the computing device includes a fragment module to process and execute the fragments. For instance, when a fragment of an application ends the operation of the fragment and leads to another fragment, the fragment module can immediately stops and cleans up the fragment, and starts running the other fragment. In another embodiment, the computing device runs a launcher program to manage the operations of the fragments of the application. For instance, the launcher program can determine that a running fragment now leads to another fragment, and accordingly starts launching the other fragment immediately.

The fragments can have different versions specifically for different types of client devices. For instance, the fragments can have both English and Chinese versions of the fragments, designed for computing devices with English or Chinese language preference, respectively. The fragments can have different versions for different types of devices, different operating systems, or different mobile operator. For instance, the fragments of an application can have two different versions designed for Android tablets running on Verizon mobile network, and iPhone smart phones running on AT&T mobile network, respectively.

The downloading and caching of the fragments can be dynamically determined by various factors of the computing device. The computing device can monitor the operation of the currently running fragments and predict the next possible fragments to be cached. The computing device can adjust the fragments streaming queue based on the current network transferring speed and the workload of the computing device.

In some embodiments, the computing device can purge ("delete") the fragments that have already been executed and are no longer needed for the current and future operation of the application. This saves the storage space and the computing device and can increase the cache space for caching the incoming fragments for potential future operation of the application.

Figure 4:
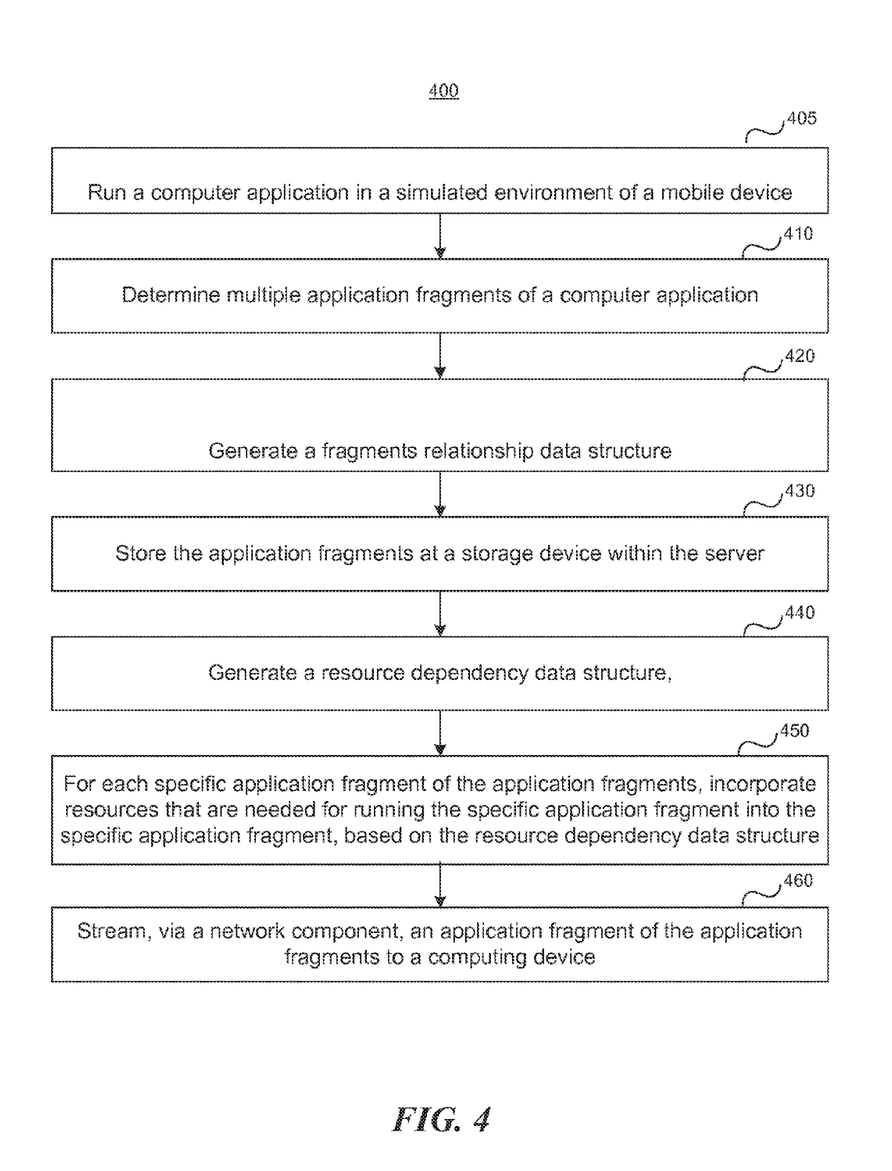
FIG. 4 illustrates an example of an application fragmentation process.

FIG. 4 illustrates an example of an application fragmentation process. The process 400 can be performed by a server, or a computing device as a part of the crowd sourced processing. Although in the embodiment illustrated in FIG. 4, steps are performed by a server, the steps can also be performed by a computing device. At step 405 of the process 400, the server runs a computer application in a simulated environment of a mobile device. At step 410, by running the computer application in the simulated environment, the server determines multiple application fragments of a computer application. Each application fragment of the application fragments includes a code to present at least one interface of the computer application.

At step 420, the server generates a fragments relationship data structure. The fragments relationship data structure includes identifications of application fragments that leads to another application fragment of the application fragments. At step 430, the server stores the application fragments at a storage device within the server.

At step 440, the server generates a resource dependency data structure, wherein for each specific application fragment of the application fragments, the resource dependency data structure includes identifications of resources that are needed for running the specific application fragment. The resources can include images, icons, texts, audios, videos, 3D models, or other data included in the computer application.

In one embodiment, at step 450, for each specific application fragment of the application fragments, the server incorporates resources that are needed for running the specific application fragment into the specific application fragment, based on the resource dependency data structure. In another alternative embodiment, the resources are not incorporated in the fragments. Instead, the server streams, via the network component, resources that are needed for running the application fragment to the computing device, based on the resource dependency data structure.

At step 460, the server streams, via a network component, an application fragment of the application fragments to a computing device, wherein the application fragment can potentially follow another application fragment currently running on the computer device based on the fragments relationship data structure.

Figure 5:
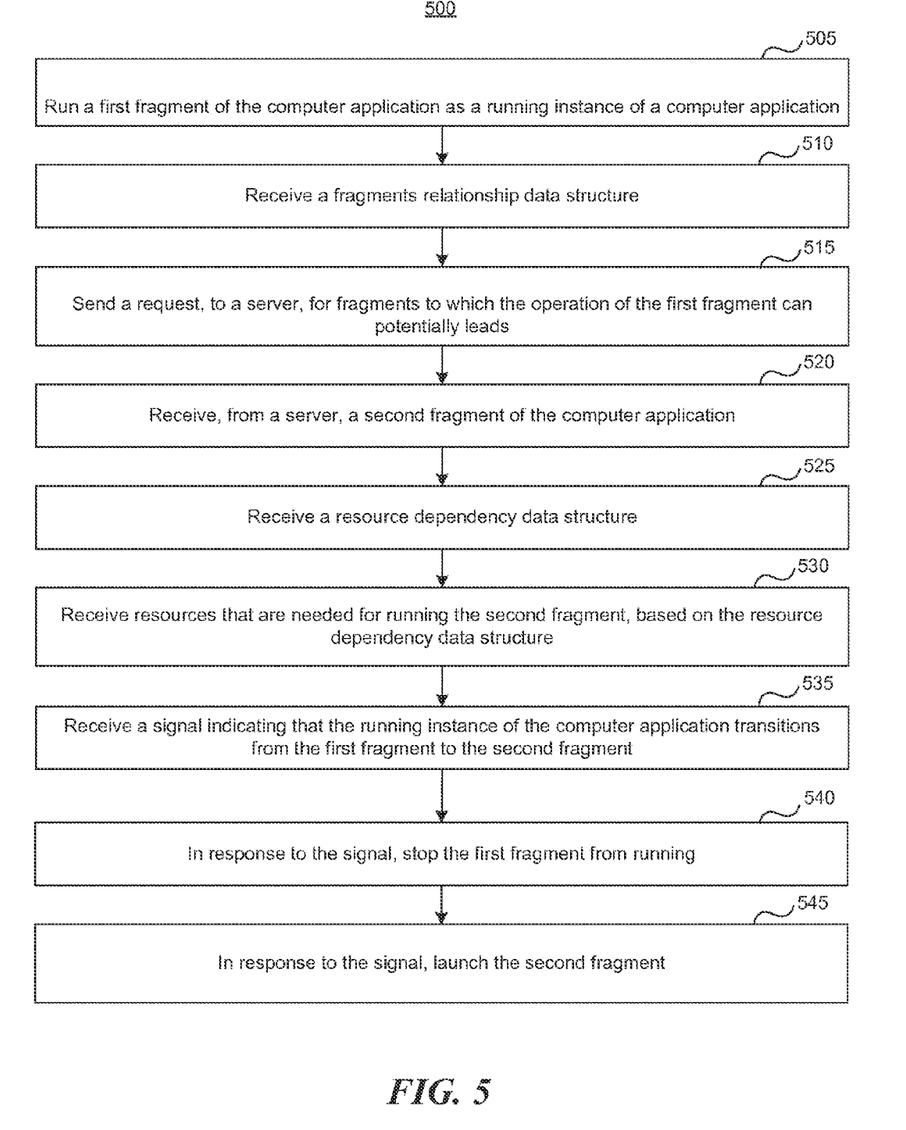
FIG. 5 illustrates an example of a process for receiving and running fragments of an application.

FIG. 5 illustrates an example of a process for receiving and running fragments of an application. At step 505 of the process 500, the computing device runs a first fragment of the computer application as a running instance of a computer application. At step 510, the computing device receives a fragments relationship data structure. The fragments relationship data structure includes identifications of fragments that leads to another fragment of the computer application.

At step 515, the computing device sends a request, to a server, for fragments to which the operation of the first fragment can potentially leads. At step 520, the computing device receives, from a server, a second fragment of the computer application, wherein operation of the first fragment can potentially leads to the second fragment.

At step 525, the computing device receives a resource dependency data structure. The resource dependency data structure includes identifications of resources that are needed for running fragments of the computer application. At step 530, the computing device receives resources that are needed for running the second fragment, based on the resource dependency data structure. Alternatively, in some other embodiments, the second fragment itself includes resources that are needed for running the second fragment.

At step 535, the computing device receives a signal indicating that the running instance of the computer application transitions from the first fragment to the second fragment. At step 540, in response to the signal, the computing device stops the first fragment from running. At step 545, in response to the signal, the computing device launches the second fragment.

In some other embodiments, a computing device can run a container application responsible for managing, launching and closing the fragments of a computer application. The computing device receives a first fragment of the computer application from a server. Under the control of the container application, the computer device executes the first fragment. The container application can executes the first fragment within the container application itself; or the container application send commands to the operating system of the computing device to execute the first fragment.

Either the container application or the server determines the next fragment that potentially follows the first fragment. In one embodiment, the container application determines a second fragment of the computer application that follows the first fragment, based on a fragments relationship data structure; then the container application requests and receives the second fragment of the computer application from the server. In another embodiment, the container application generates and sends a request to the server for fragments to which an operation of the first fragment can potentially leads; then receives a second fragment determined by the server.

When the first fragment of the computer application ends its execution, the container application launches the second fragment accordingly to continue the execution of the computer application. Therefore, under the control of the container application, the computer application can run seamlessly on the computer device without the need that all fragments of the computer application has to be downloaded to the computing device. The container application can further delete ended fragments (e.g. the first fragment) from the computing device to save local storage space.

Figure 6:
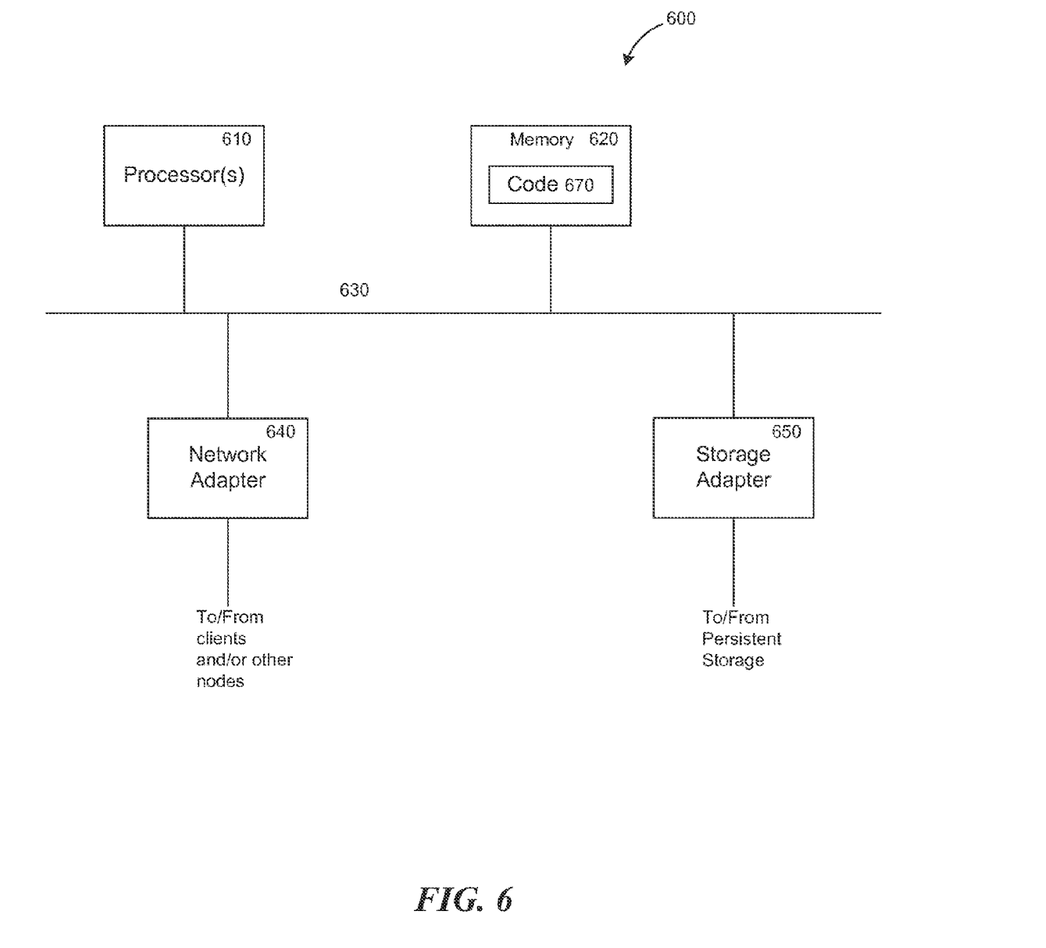
FIG. 6 is a high-level block diagram showing an example of the architecture of a computer, which may represent any computing device or server described herein.

FIG. 6 is a high-level block diagram showing an example of the architecture of a computer 600, which may represent any computing device or server described herein. The computer 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may contain a code 670 containing instructions according to the technology disclosed herein.

Also connected to the processor(s) 610 through the interconnect 630 are a network adapter 640 and a storage adapter 650. The network adapter 640 provides the computer 600 with the ability to communicate with remote devices, over a network and may be, for example, an Ethernet adapter or Fibre Channel adapter. The network adapter 640 may also provide the computer 600 with the ability to communicate with other computers. The storage adapter 650 allows the computer 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer-implemented method comprising:
determining multiple application fragments of a computer application, wherein each application fragment of the application fragments includes a code to present at least one interface of the computer application;
storing the application fragments at a storage device;
generating a resource dependency data structure, wherein for each specific application fragment of the application fragments, the resource dependency data structure includes identifications of resources that are needed for running the specific application fragment;
determining a fragment relationship data structure, wherein the fragment relationship data structure includes one or more application fragments that follow an application fragment during operation of the computer application, the one or more application fragments being determined by running the application through an emulator, the emulator determining the one or more application fragments based on the resource dependency of the one or more application fragments, the resource dependency of a given application fragment being a function of one or more resources required to display at least one user interface associated with the given application fragment, and wherein the emulator enables the splitting of the computer application into a first application fragment and a second application fragment when the resource dependency of a first user interface of the computer application changes from the resource dependency of a second user interface of the computer application, the first application fragment corresponding to the first user interface and the second application fragment corresponding to the second user interface; and streaming, via a network component, at least one application fragment of the application fragments to a computing device.

2. The computer-implemented method of claim 1, further comprising:

for each specific application fragment of the application fragments, incorporating resources that are needed for running the specific application fragment into the specific application fragment, based on the resource dependency data structure.

3. The computer-implemented method of claim 1, further comprising:

streaming, via the network component, resources that are needed for running the application fragment to the computing device, based on the resource dependency data structure.

4. The computer-implemented method of claim 1, wherein the resources include images, icons, texts, audios, videos, 3D models, or other data included in the computer application.

5. The computer-implemented method of claim 1, wherein the determining further comprises:

running the computer application in a simulated environment of a mobile device.

6. A computer-implemented method comprising:

running, at a computing device, a first fragment as a running instance of a computer application;

receiving, from a server, a second fragment of the computer application, wherein operation of the first fragment can potentially leads to the second fragment;

receiving a signal indicating that the running instance of the computer application transitions from the first fragment to the second fragment; and in response to the signal, launching the second fragment, wherein the first application fragment corresponds to an activity in a first operating environment, wherein the second application fragment corresponds to the activity in a second operating environment, and wherein the second application fragment follows the first application fragment in response to detecting a transition from doing the activity on a first device to doing the activity on a second device, the first device hosting the first operating environment and the second device hosting the second operating environment, the first operating environment being a different type of operating environment from the second operating environment.

7. The computer-implemented method of claim 6, further comprising:

in response to the signal, stopping the first fragment from running.

8. The computer-implemented method of claim 6, wherein the second fragment includes resources that are needed for running the second fragment.

9. The computer-implemented method of claim 6, further comprising:

receiving a resource dependency data structure, wherein the resource dependency data structure includes identifications of resources that are needed for running fragments of the computer application.

10. The computer-implemented method of claim 9, further comprising:

receiving resources that are needed for running the second fragment, based on the resource dependency data structure.

11. The computer-implemented method of claim 6, further comprising:

receiving a fragments relationship data structure, wherein the fragments relationship data structure includes identifications of fragments that leads to another fragment of the computer application.

12. The computer-implemented method of claim 11, further comprising:

sending a request, to the server, for fragments to which the operation of the first fragment can potentially leads.

13. A server comprising:

a network component configured to communicate with a first computing device;

a processor;

a memory storing instructions which, when executed by the processor, cause the server to perform a process including:

receiving, from the first computing device, multiple fragments of the computer application based on at least one portion of a computer application, wherein each fragment of the fragments includes a code to present at least one interface of the computer application, and the fragments are generated by the first computing device by running the portion of the computer application;

receiving, from the first computing device, a fragment relationship data structure, wherein the fragment relationship data structure includes one or more application fragments that follow an application fragment during operation of the computer application, the one or more application fragments being determined by running the application through an emulator, the emulator determining the one or more application fragments based on the resource dependency of the one or more application fragments, the resource dependency of a given application fragment being a function of one or more resources required to display at least one user interface associated with the given application fragment, and wherein the emulator enables the splitting of the computer application into a first application fragment and a second application fragment when the resource dependency of a first user interface of the computer application changes from the resource dependency of a second user interface of the computer application, the first application fragment corresponding to the first user interface and the second application fragment corresponding to the second user interface; and receiving, from the first computer device, a resource dependency data structure, wherein for each specific fragment of the fragments, the resource dependency data structure includes identifications of resources that are needed for running the specific fragment.

14. The server of claim 13, wherein the process further includes:

receiving a fragments relationship data structure, wherein the fragments relationship data structure includes identifications of fragments that leads to another fragment of the fragments.

15. The server of claim 13, wherein the process further includes:

receiving, from a second computing device, at least on additional fragment of the computer application.

16. The server of claim 13, wherein the process further includes:
  in response to a request for the computer application from a client computing device, transmitting at least one fragment of the fragments to the client computing device.

17. The server of claim 16, wherein the process further includes:
  transmitting fragments that can potentially follow the at least one fragment, based on a fragments relationship data structure.

18. The server of claim 16, wherein the transmitted fragments are selected so that the transmitted fragments are enough for the client computing device to start or continue running the computer application.

19. A computer-implemented method comprising:
  running, at a computing device, a container application;
  receiving, from a server, a first fragment of a computer application;
  executing, at the computing device, the first fragment through a control of the container application; and
  launching, at the computer device, a second fragment of the computer application received from the server by the container application when the first fragment ends its execution, and based on data from a fragments data structure indicating that the second application fragment follows the first application fragment during operation of the computer application wherein the fragment data structure includes one or more application fragments that follow an application fragment during operation of the computer application, the one or more application fragments being determined by running the application through an emulator, the emulator determining the one or more application fragments based on the resource dependency of the one or more application fragments, the resource dependency of a given application fragment being a function of one or more resources required to display at least one user interface associated with the given application fragment, and wherein the emulator enables the splitting of the computer application into the first application fragment and the second application fragment when the resource dependency of a first user interface of the computer application changes from the resource dependency of a second user interface of the computer application, the first application fragment corresponding to the first user interface and the second application fragment corresponding to the second user interface.

20. The computer-implemented method of claim 19, further comprising:
  sending a request generated by the container application, to the server, for fragments to which an operation of the first fragment can potentially leads; and
  receiving, from the server, a second fragment of the computer application.

* * * * *